J. E. WEBB.
TIE WIRE REMOVER.
APPLICATION FILED SEPT. 11, 1917.
1,311,475.
Patented July 29, 1919.
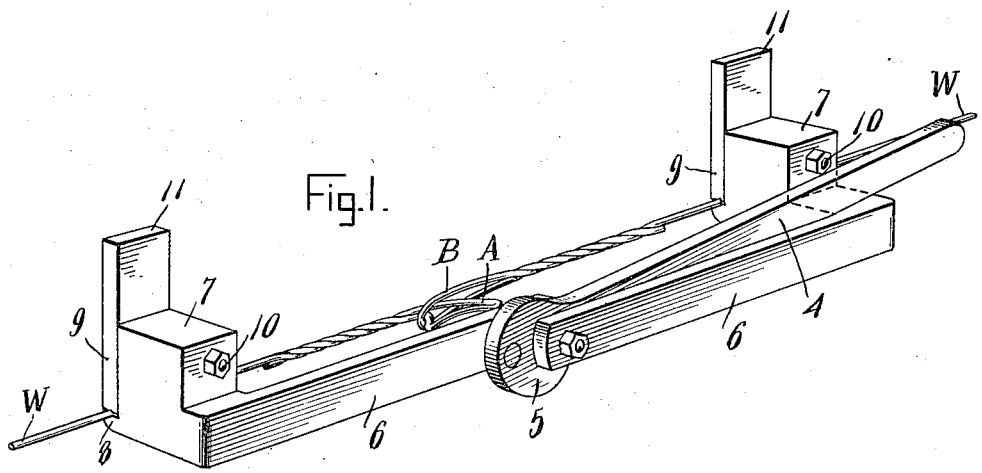
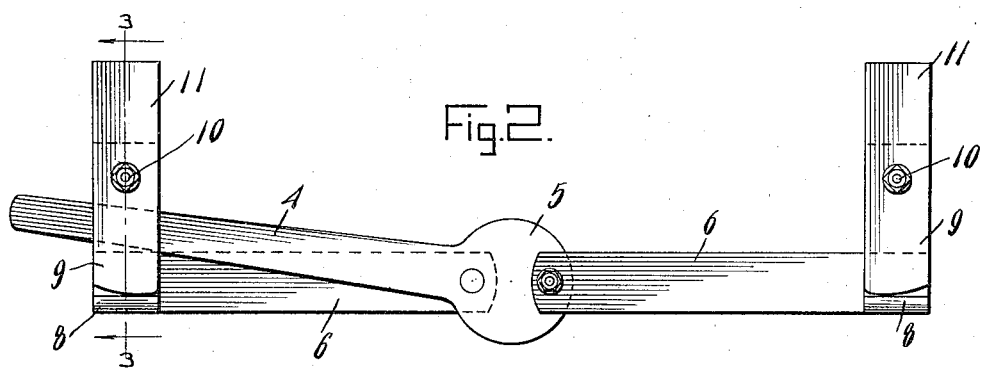
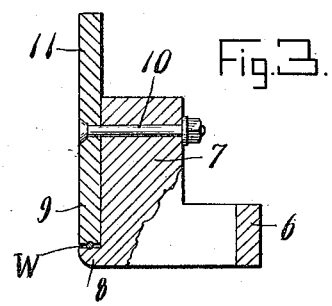
Inventor
John E. Webb
By Bradford & Doolittle,
Attorneys

UNITED STATES PATENT OFFICE.

JOHN E. WEBB, OF ISLAND FALLS, MAINE.

TIE-WIRE REMOVER.

1,311,475. Specification of Letters Patent. Patented July 29, 1919.

Application filed September 11, 1917. Serial No. 190,792.

*To all whom it may concern:*

Be it known that I, JOHN E. WEBB, a citizen of the United States, residing at Island Falls, Aroostook county, and State of Maine, have invented and discovered certain new and useful Improvements in Tie-Wire Removers, of which the following is a specification.

My said invention relates to devices for removing binding wires from baled hay, or the like, and consists in the combinations and arrangements of elements hereinafter described and particularly set forth in the accompanying claim.

The invention has for its purpose to provide a tool or implement adapted to securely grip the end portions of a bale binding wire for stretching said wire to disengage the connected ends, or fastening means employed, whereby the bale wire and such fastening means may be recovered intact for further use.

Another object of the invention consists in constructing a tool of this type which may be readily applied to the bale wire in a simple and easily performed manner; wherein the leverage is such that the wire may be stretched for the purpose stated by a simple manual movement; and one wherein the wire engaging members are adapted to be readily released after engagement, or made more secure in engagement as desired.

The invention is disclosed by way of illustration in the accompanying drawings wherein:

Figure 1 is a perspective view thereof showing the application of the device.

Fig. 2 a front elevational view of the same, and

Fig. 3 is a transverse view taken on the line 3—3 of Fig. 2.

Referring to the construction in further detail and wherein like reference characters indicate corresponding parts in the different figures shown the device consists of a lever 4 having an enlarged fulcrum end 5 to which is pivotally connected the pair of bars or arms 6, and said pivotal connections are eccentrically disposed so that the working of the lever will separate or draw the bars together as will be understood.

Each of the arms 6 is provided with an enlarged end portion or block 7 of appreciable thickness and both of said blocks are disposed to one side of the innermost arm 6 as shown. Thus by this provision the working lever 5 is at all times located a considerable distance away from the bale surface giving freedom of movement of the hand and arm.

The two blocks 7 are each formed with an integral ledge 8 slightly recessed or grooved to receive the bale wire W and a cam member or lever 9 is pivotally mounted on the bolt 10 in each block. The two cam levers 9 are provided with extended portions 11 which serve to receive the blows of a hammer, or other instrument, if it should become necessary to use such a means to release the lever from its wedging engagement with the wire, and said members 11 will also serve for driving the wedge into more secure engagement as will be understood.

In operation the device is placed against the side of the bale of hay or other substance and the two wedge blocks opened to receive the wire strand, and with the connected ends A and B between the blocks 7 and approximately at the point of the lever fulcrum. The two cam levers 9 are then moved to engage the wire, and the lever 4 operated when said fastening members A and B will be drawn together and free to be disengaged.

It will therefore be seen that with this tool constructed and operated as above stated that the bale wire may be easily removed and with its fastening members in perfect condition to be used again.

It is obvious that those skilled in the art may vary the details of construction and arrangement of parts without departing from the spirit of the invention, I do not therefore wish to be limited to such features except as may be required by the claim.

Having thus described my said invention what I claim as new and desire to secure by Letters Patent is:

A wire stretcher comprising a lever having an enlarged fulcrum end portion, a pair of arms pivotally mounted on said fulcrum portion, a pair of blocks formed integrally with said arms at the distal ends thereof and offsetting from said arms, said blocks being of appreciable size and constructed with ledge portions, and a pair of cam blocks pivotally mounted on said blocks and coöperable with said ledges to form wire engaging members, said cam blocks being of the same width as said blocks whereby to lie flush with the sides thereof when the cam blocks are in closed position, and having extended portions of the same cross sectional dimensions as the blocks proper adapted to receive blows from an instrument to release the parts secured thereby, substantially as set forth.

In witness whereof, I have hereunto set my hand and seal at Island Falls, Maine, this 4th day of September, A. D. nineteen hundred and seventeen.

JOHN E. WEBB. [L. S.]

Witnesses:
FRANK L. MOONEY,
B. R. WHITE.